(12) United States Patent
Chevtsov

(10) Patent No.: US 7,172,236 B1
(45) Date of Patent: Feb. 6, 2007

(54) TARGA ROOF SYSTEM WITH A BUTTRESS

(75) Inventor: Dmitri Chevtsov, West Bloomfield, MI (US)

(73) Assignee: American Sunroof Corporation, Troy, MI (US)

( * ) Notice: Subject to any disclaimer, the term of this patent is extended or adjusted under 35 U.S.C. 154(b) by 0 days.

(21) Appl. No.: 11/460,561

(22) Filed: Jul. 27, 2006

(51) Int. Cl.
*B60J 7/00* (2006.01)

(52) U.S. Cl. .................. 296/107.17; 296/108

(58) Field of Classification Search ........... 296/107.01, 296/107.16, 107.17, 108, 107.07, 107.08, 296/107.09
See application file for complete search history.

(56) References Cited

U.S. PATENT DOCUMENTS

| | | | |
|---|---|---|---|
| 3,823,977 A | | 7/1974 | Fioravanti |
| 4,805,956 A | * | 2/1989 | Saunders ............... 296/107.17 |
| 4,819,982 A | | 4/1989 | Eyb |
| 4,950,022 A | | 8/1990 | Pattee |
| 5,098,148 A | * | 3/1992 | Hoban ......................... 296/66 |
| 6,527,332 B2 | | 3/2003 | Fioravanti |

OTHER PUBLICATIONS

Magazine article: "Soviet design in international contest" Design Review, Sep. 1989, p. 2, FISPE, Moscow, USSR.
Magazine article: "Let the sun shine in! A targa-top design alternative from the USSR" Automotive Industries, Feb. 1990, p. 52, Chilton, Radnor, PA, USA.

* cited by examiner

*Primary Examiner*—Joseph D. Pape

(57) ABSTRACT

A retractable Targa roof system having a windshield header, a pair of side pillars, a rollbar, a backlight, a single pivoting roof panel and at least one pivot-carrying buttress. The rigid roof panel has at least one fixedly attached swing arm independent of the side pillars and pivotally articulated to said buttress. The buttress pivot is positioned between the bases of the side pillars in transverse direction and substantially above the belt line of the vehicle. Various arrangements of the system allow for a rearward rotary motion to bring the roof panel into either externally retracted position above a forward-hinged deck lid, or internally retracted position under a rear-hinged deck lid.

14 Claims, 5 Drawing Sheets

TARGA ROOF SYSTEM WITH A BUTTRESS

BACKGROUND OF THE INVENTION

The present invention relates to a convertible motor vehicle with a moveable roof, particularly a rigid roof panel, which can be pivoted rearward around a horizontal transverse axis to its opened position on top of or under the rear deck lid.

U.S. Pat. No. 4,950,022 (Pattee) describes a motor vehicle where the pivoting hardtop comprises right and left side leg members, which form upper halves of B-pillars accordingly. Lower halves of the pillars support the pivots, and the backlight is made removable. A disadvantage in this case is that unfeasible sealing conditions exist between the bases and moveable upper halves of the pillars. The pivoting pillars also result in a poor side glass seal, and the rear glass has to be displaced during retraction of the top.

Furthermore, from U.S. Pat. No. 6,527,332 (Fioravanti), a moveable top is disclosed as a one-piece shell pivoted to the inner surfaces of B-pillars. As in the previous sample, here the pillars are not connected by a rollbar of any kind, which results in a weak structure and chronic misalignment of the moveable top to the body of the vehicle. This top has notoriously poor sealing conditions at the side pillars, as well as at the bottom of the pivoting backlight.

In both cases the rotating rear window takes considerable space from the cockpit, reducing legroom. Because the top is pivoted directly to the side pillars, the inner surfaces of said pillars are limited to being vertical in the rear view. Noticeably, the appearance of vertical B-pillars is aesthetically uncertain, especially for vehicles of this type. Also the roof in its opened position overlays the entire deck immediately aft of the rear glass, which would block ventilation openings in cars with midengine layout. Moreover, these systems jeopardize overall safety of a car as they lack any protective rollbar.

Consequently, there remains a need for a convertible roof system with a simple, robust design, while improving safety and packaging of a car.

SUMMARY OF THE INVENTION

It is an object of the invention to provide a convertible roof construction with a rollbar system, common type seals, and a cockpit space which is not reduced neither during the roof operation nor in its opened position.

This object has been achieved by providing the roof panel with a swing arm(s) pivoted to supplementary buttress(es), instead of side pillars. The side pillars, particularly B-pillars of two-seat cars, carry inner trim panels as well as multiple seals to the roof, backlight, side glass, and door panels. It is advantageous with respect to efficiency that in this invention the buttress/swing arm arrangement is free of those functions and dedicated to roof pivoting. As a result, the roof panel has independent means of pivoting and does not have to be sealed to the inner surfaces of the side pillars. Thus, the side pillars can support a conventional rollbar. The separate pivoting mechanism is more reliable while preserving the overall structural integrity of the system.

Preferably, two swing arms are equidistantly spaced further inboard from the sides of the roof panel. This layout provides superior support and structural rigidity necessary for the moving roof panel. It also results in a less obstructed rear view. The buttress/swing arm design is possible in a variety of styles with different finishes, trim and garnish pieces.

The roof panel can be retracted either externally or internally, depending on dimensions and packaging of a specific vehicle. In case of a forward tilting deck lid the roof panel rotates approximately a half-turn to an upside-down position on top of the deck lid. A moveable rear deck spoiler then overlaps and secures the roof in opened position. No seals are needed in addition to standard header and rollbar seals. Also, the buttress and swing arm may function as air or water directing elements.

Alternatively, a rearward tilting deck lid makes possible for the roof panel to be retracted inside the vehicle body. Corresponding notches are provided at the front edge of the deck lid and adjacent body panels to accommodate the swing arms.

The system can be configured such that when the roof is in its opened position there is a sufficient space between the roof panel and the backlight for ventilation openings in the rear deck of midengine cars. An auxiliary swing arm swivel or lift mechanism may be provided for specific motion control of the roof panel during beginning and ending phases of operation. The roof panel locks engage with the front header or the rear spoiler, securing the roof in its closed or opened position respectively. The invention will become more readily apparent from the following description thereof on the basis of the accompanying drawings.

DETAILED DESCRIPTION OF THE INVENTION

Figure 1:
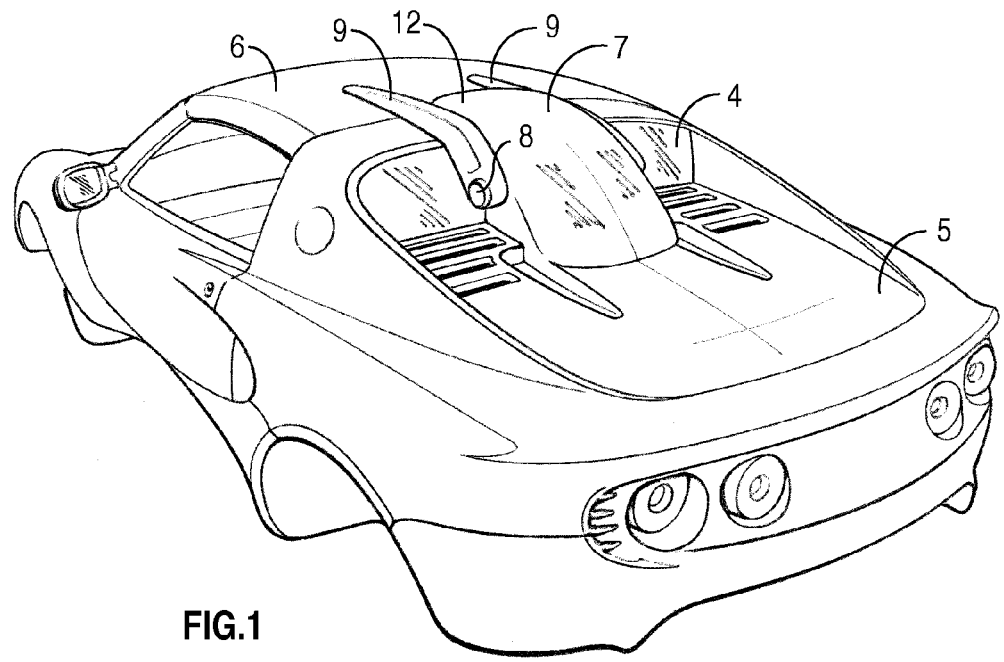
FIG. 1 is an isometric rear view of a vehicle with a central buttress and the roof closed.
Figure 2:
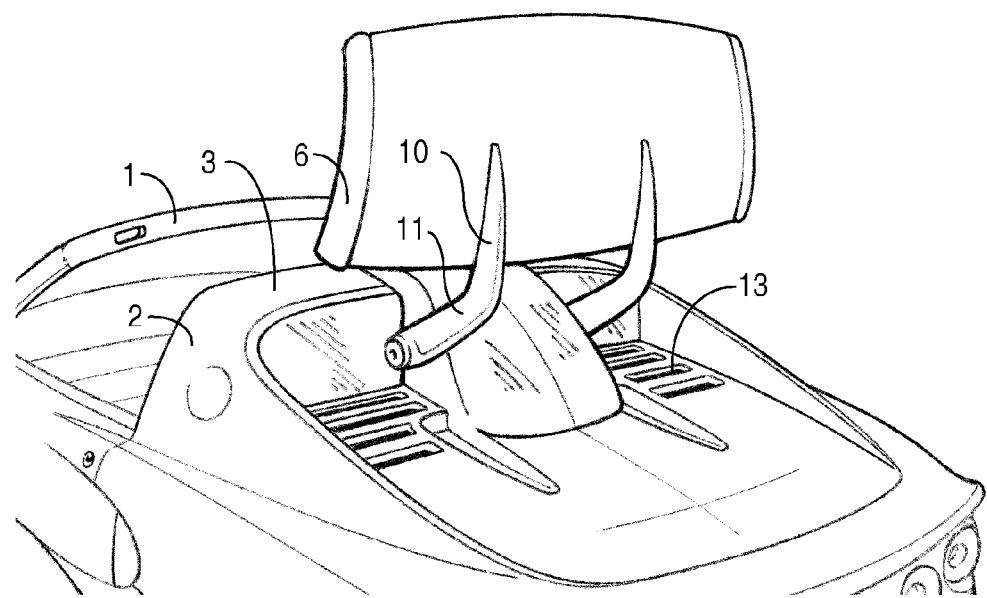
FIG. 2 is a partial isometric rear view of a vehicle greenhouse with a central buttress and the roof panel in a transitional (half-open) position

The base system, as shown in FIGS. 1 and 2, has a windshield header 1, a pair of side pillars 2 supporting a rollbar 3, a non-pivoting backlight 4, and a single pivoting roof panel 6. The roof panel 6 is articulated to a central mounted buttress 7 via swing arms 9 and buttress pivots 8.

This system is adaptable for cars with midengine layout. Central buttress 7 is incorporated into a structural backlight 4, which supports the pivots 8. The buttress 7 also functions as a transparent air duct with an inlet in the scoop 12 above the rollbar 3. Elongated segments 10 of the swing arms 9 are integral reinforcement elements of the composite roof structure. They border left and right sides of the buttress 7 and form air-directing ribs on the roof surface. Slanted pylons 11 rotate the roof panel 6 approximately 180° rearward to an up-side-down position on top of the deck lid 5 and further back from the backlight 4. Advantageously, with this arm geometry, the roof panel 6 in opened position does not obstruct the deck vents 13.

Figure 3:
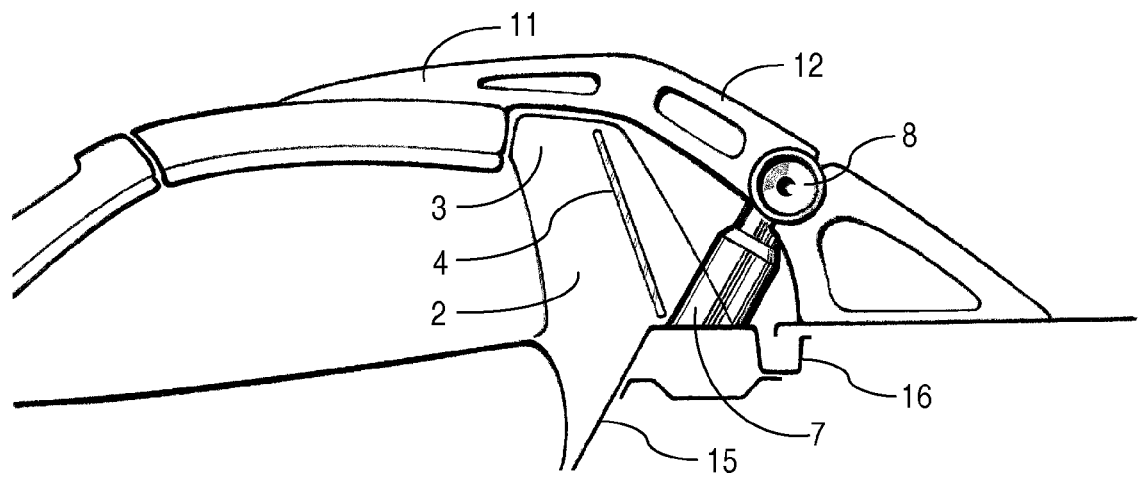
FIG. 3 is a schematic side view of the flying buttress with the roof panel in closed position.

FIG. 3 shows the system with a freestanding buttress 7 positioned behind the backlight 4. A freestanding buttress is defined as an individual formation without structural connection to the rollbar 3 or side pillars 2. A crossmember 15 at the back of the passenger compartment provides the most suitable support for a buttress positioned between side pillars. The crossmember 15 may be shaped as a beam, package shelf, or bulkhead with integrated gutter 16. Additional reinforcing brackets, supports, extensions, or spacers may be used in connection with the buttress.

Preferably, two transversely spaced buttresses 7 with buttress pivots 8 are mounted on the crossmember 15 symmetrically to the vehicle's longitudinal centerline. This arrangement positions the swing arm pylons 11 predominantly in the dead zones of the rear field of view, minimizing the system's impact on the rearview visibility.

Figure 4:
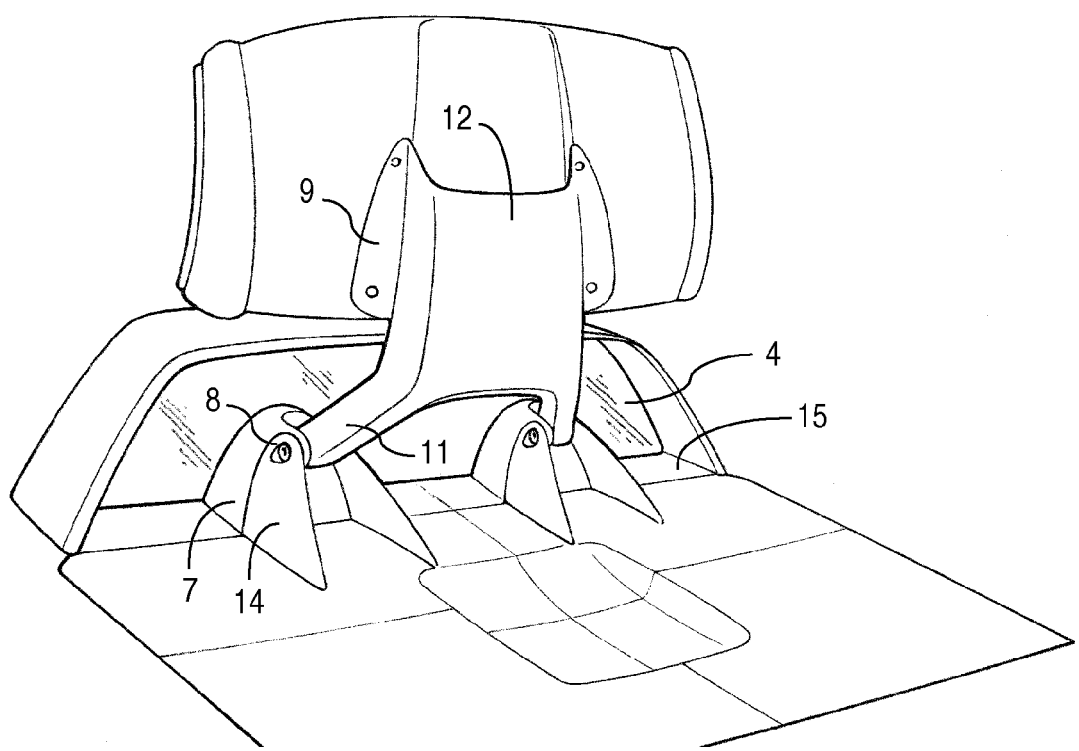
FIG. 4 is an isometric rear view of the system with two independent buttresses, the swing arm shaped as an air scoop, and the roof panel in a transitional position.

The swing arm 9 may have various types of construction. FIG. 4 shows an aftermarket application where a one-piece swing arm 9 is made of lightweight composite and affixed to a transparent roof panel 6 shown here in a transitional position. The arm pylons 11 are integrated into an air scoop 12, which directs air to a low-pressure area behind the backlight 4. The deck lid hinge brackets 14 are shaped as extensions of the independent buttresses 7 forming two follower bodies typical of sports cars.

Figure 5:
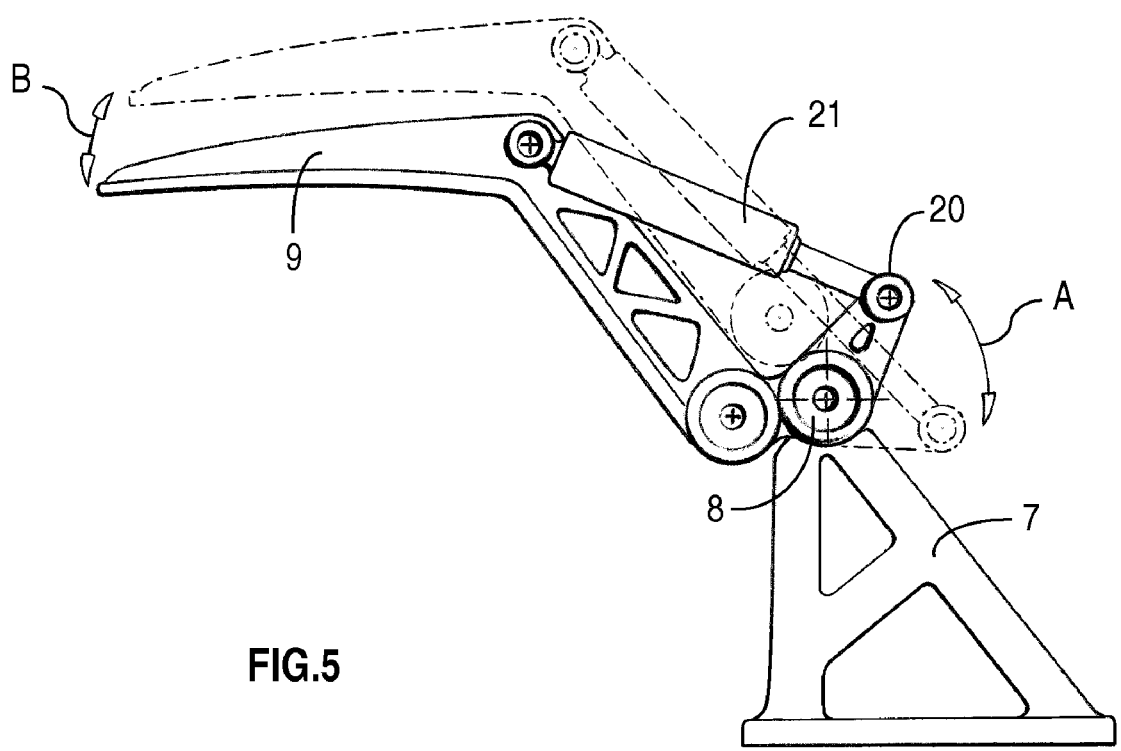
FIG. 5 is a schematic side view of the flying buttress with auxiliary swivel mechanism.

As illustrated in FIG. 5, a freestanding flying buttress 7 supports a lightweight alloy swing arm 9 with an auxiliary lift mechanism 20 sampled here as a double-hinge swivel lever. During the opening operation the lift mechanism 20 first carries out a swivel movement (A) resulting in the upward displacement (B) for the roof panel to clear the rollbar and the header (not shown). Then, a single rotation around the buttress pivot 8 moves the system into retracted position. Conversely, at the end of the closing cycle, the lift mechanism 20 lowers the roof until it is properly engaged with the rollbar and the header. The lift-out motion of the arm 9 can be controlled, for example, by a balance link or an actuator 21 and performed by a linear slide or other known means. In addition, the auxiliary lift mechanism 20 may be employed for guiding the roof panel into the trunk or under the rear spoiler.

Figure 6:
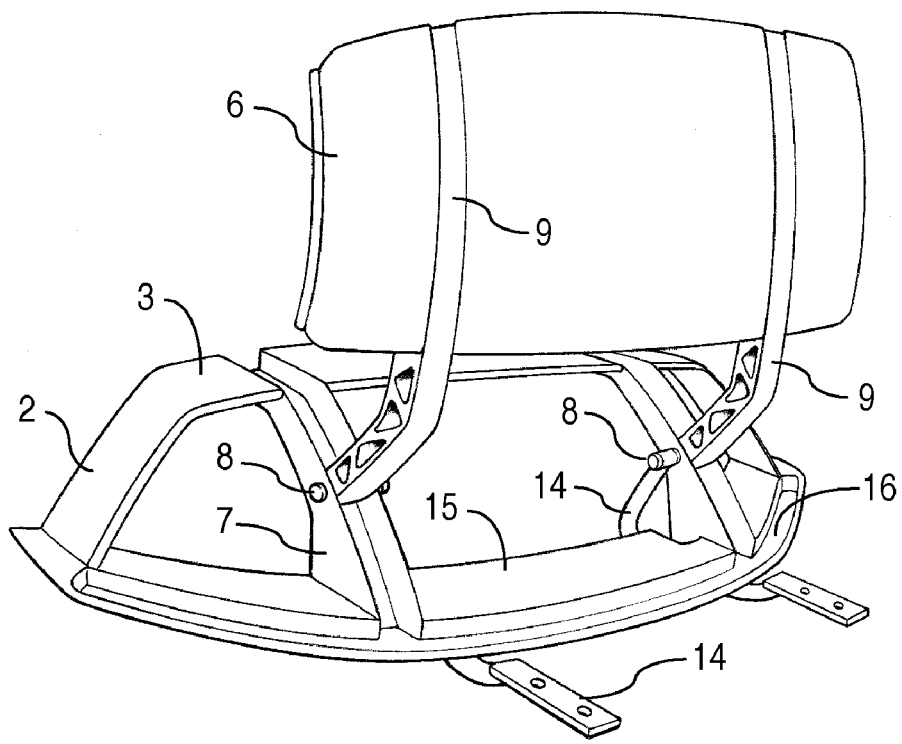
FIG. 6 is an isometric rear view of the system configured as a subassembly with a crossmember.

In FIG. 6 the system is configured as an aftermarket replacement for a soft top on convertible vehicles. The swing arms 9 are made of a lightweight alloy and bonded to a composite roof panel 6. Two buttresses 7 are mounted on a lower body crossmember 15 with a gutter 16, and support the rollbar 3. They are spaced apart from the bases of the side pillars 2. The buttress pivots 8 are positioned in front of the backlight 4 (not shown) allowing for the deck lid hinge brackets 14 to be articulated to the buttresses 7 at the same pivot points 8 as the swing arms 9.

Figure 7:
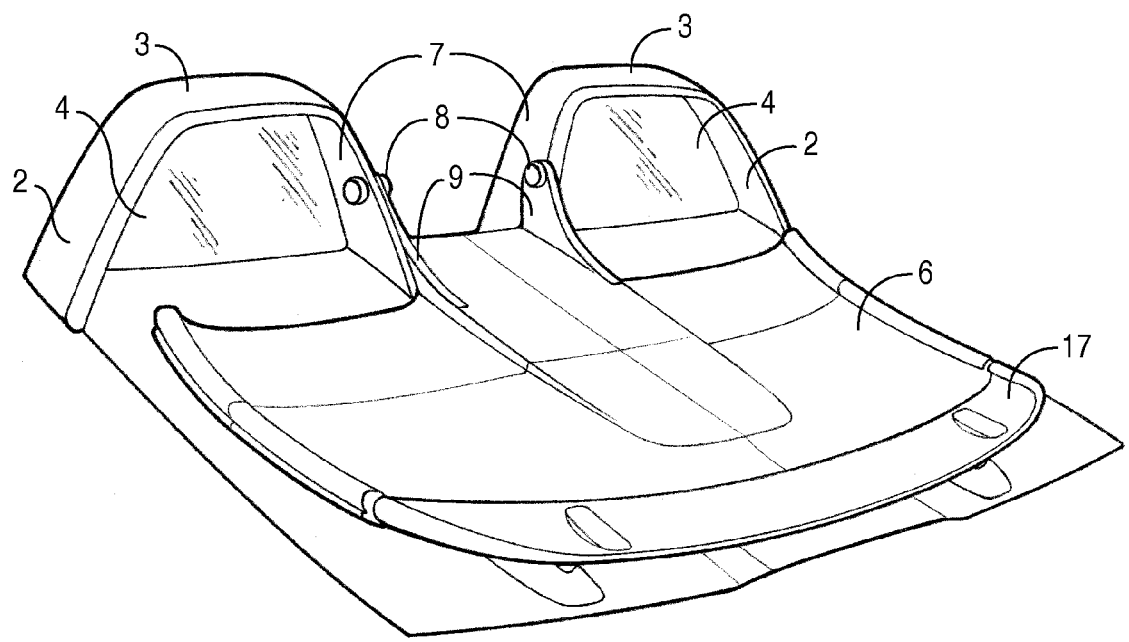
FIG. 7 is an isometric rear view of the system with a double-loop rollbar system and the roof panel in opened position.

With reference to FIG. 7 the system includes dual rollbars 3 supported by side pillars 2 and inner buttresses 7 with buttress pivots 8. The swing arms 9 are shaped as a pair of structural ribs or gussets extending upward from the roof panel 6 shown in the externally retracted position, whereas the rear spoiler 17 overlaps the front edge of the roof panel 6. The backlight 4 includes a moveable wind deflector (not shown) placed between the buttresses 7.

Figure 8:
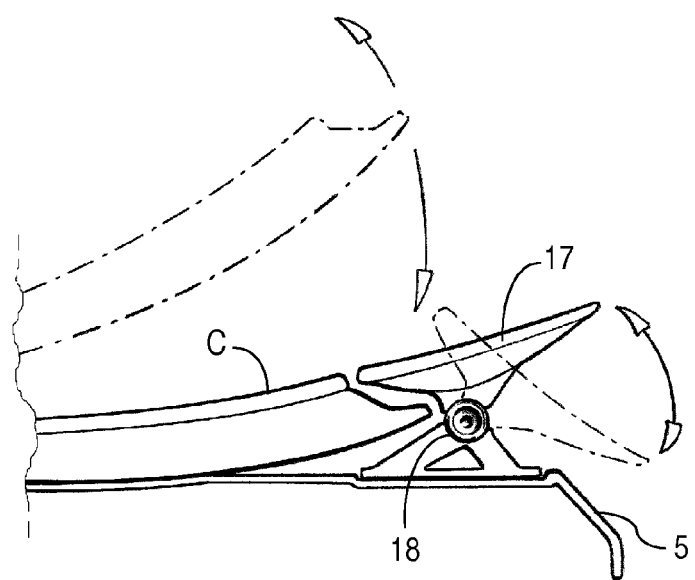
FIG. 8 is a schematic side view of a moveable spoiler and the roof panel in opened position.

Another feature of this invention is a spoiler 17 (FIG. 8) positioned at the back of the rear deck. The spoiler in this case is made pivotable rearward around the pivot 18, allowing the roof panel 6 to move into its fully retracted position C. The spoiler 17 then pivots forward overlapping the front edge of the roof panel and effectively locking it in place. The spoiler 17 is configured in cooperation with the leading edge of the roof panel to provide a refined appearance and streamlined aerodynamics to the system in an externally retracted position. The spoiler 17 can be made moveable by a four-bar mechanism, a linear slide, or other means, including an automatic actuator. It also can be positioned directly on the vehicle body or on the openable rear deck lid 5.

Figure 9:
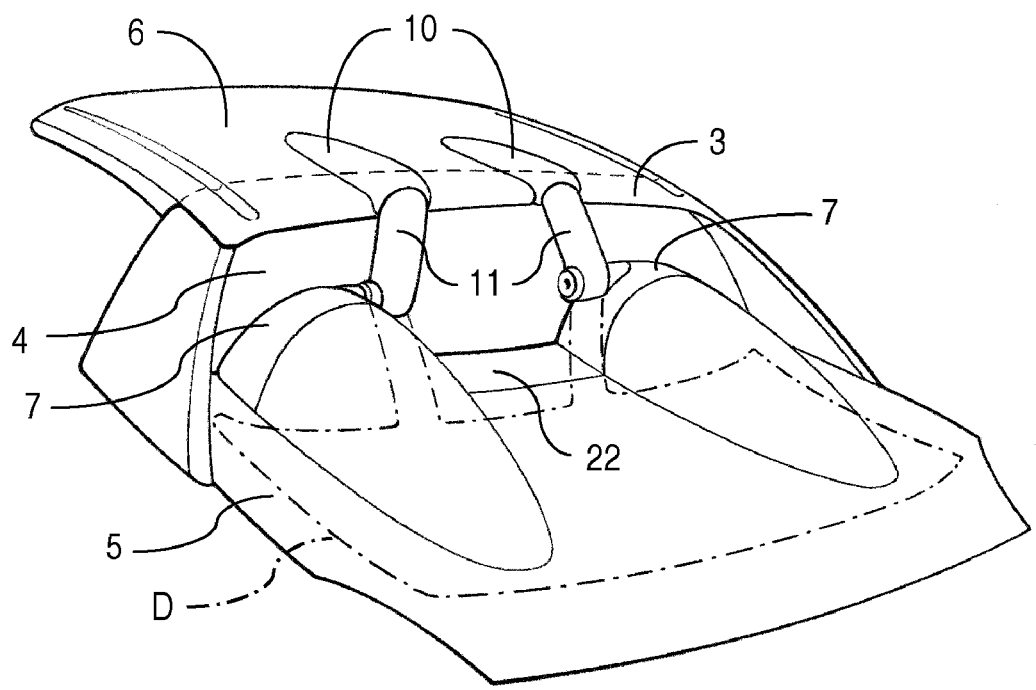
FIG. 9 is an isometric rear view of the system with a rear-hinged deck lid.

In the embodiment of FIG. 9 the longitudinal segments 10 of the swing arms are shaped as integrated oblong bulges on the surface of the composite roof panel 6, while the swing arm pylons 11 are made of metal stampings. The rearward tilting deck lid 5 allows the roof panel 6 to be internally retracted into position D. The rear deck has an aperture 22 between the backlight 4 and deck lid 5 for the pylons 11 to pass through when the roof is in position D under the deck lid 5. The aperture 22 may be sealed when not in use. The roof panel 6 may partially or completely overlay the rollbar 3 when closed.

Figure 10:
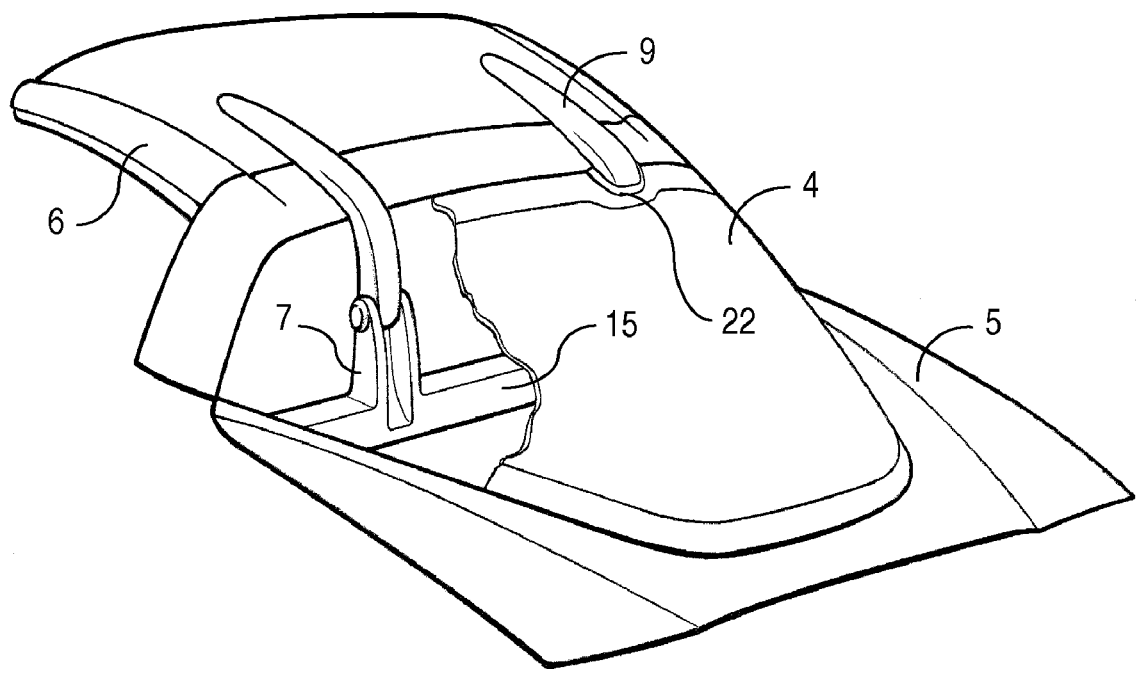
FIG. 10 is an isometric rear view of the system with a swing arm aperture between the rollbar and the rear-hinged hatchback lid.

FIG. 10 shows the system with internally positioned buttresses 7 mounted on the crossmember 15, whereas a rearward tilting deck lid 5 includes a backlight 4. In this configuration the system contains apertures 22 (one is shown) in the backlight frame for the swing arms to pass through when the roof 6 is up (closed position). Conventional gaskets may be used to seal the swing arm 9 in the aperture 22.

As shown in FIGS. 1 to 10 a specific location of the buttress pivots 8 depends on height and width of the rollbar 3, and determines the length and the angle of the swing arms 9. These parameters are critical for kinematics of the system, which may be actuated either manually with assistance of conventional balance links, or automatically through the use of an auxiliary motor drive with a manual override for the deck lid operation.

The foregoing disclosure, detailed description and specific examples, while indicating the preferred embodiment of the invention, have been set forth merely to illustrate the invention and are not intended to limit its coverage. For example, the swing arm may form a convex or concave profile on the roof surface, such as a rib, ridge or corrugation. It may be shaped as a wind deflector, air intake, fin, or wing. The buttress and the swing arm may function as a water-directing gutter. Also, the buttress 7 may be constructed as a roof drive mechanism, and may have adjustment means for alignment of the swing arm 9 to the buttress pivot 8. An additional crossmember may be positioned above an existing lower crossmember to support the buttresses 7. The deck lid 5 can be articulated to the vehicle body using a four-bar operating mechanism.

Since modifications of the disclosed embodiments incorporating the spirit and substance of the invention may occur to persons skilled in the art, the invention should be construed to include everything within the scope of the appended claims and equivalents thereof.

What is claimed is:

1. A vehicle roof system having a windshield header, a pair of side pillars, a rollbar, a backlight, a rear deck with a deck lid, and a dimensionally stable roof panel covering the passenger compartment between said header and said rollbar, said roof panel is moveable between a closed and opened position, characterized by that said system comprises at least one pivot-carrying buttress, and said roof panel having at least one swing arm pivotally articulated to said buttress, whereas said pivot is positioned between the bases of said side pillars in transverse direction and substantially above the belt line of the vehicle; said roof panel when in opened position being situated below and aft of said pivot.

2. The system according to claim 1, wherein said buttress is mounted on a structural crossmember.

3. The system according to claim 2, wherein said buttress is constructed as a freestanding pivot-carrying structure with no connection to said side pillars and said rollbar.

4. The system according to claim 1, wherein said buttress is attached to said rollbar.

5. The system according to claim 1, wherein said swing arm is constructed as a structural element of said roof panel.

6. The system according to claim 5, wherein said swing arm in closed position comprises an elongated longitudinal segment and a tilted down pylon segment connected to said pivot; said longitudinal segment functions as a roof-reinforcing element.

7. The system according to claim 1, wherein said buttress is made of a structural transparent material and functions as a backlight.

8. The system according to claim 1, wherein said pivot contains at least one auxiliary kinematic linkage coupled to said swing arm for complementary guidance of said roof panel during pivoting.

9. The system according to claim 1, wherein said buttress and swing arm arrangement acts as an air-directing device.

10. The system according to claim 1, wherein at least one aperture is provided between said deck lid and adjacent body panels to accommodate said swing arm in a partially internal position.

11. The system according to claim 1, wherein said swing arm is configured such that the roof panel in opened position is spaced considerably rearward from said backlight, whereas said rear deck has ventilation openings between said backlight and said roof panel in opened position.

12. The system according to claim 1, wherein said deck lid is hinged to said buttress pivots.

13. The system according to claim 1, wherein said rollbar comprises two individual segments supported by said side pillars and inner buttresses.

14. The system according to claim 1, wherein said rear deck comprises a spoiler with at least a portion of said spoiler being moveable, which overlays said roof panel in opened position.

* * * * *